Figure 3:
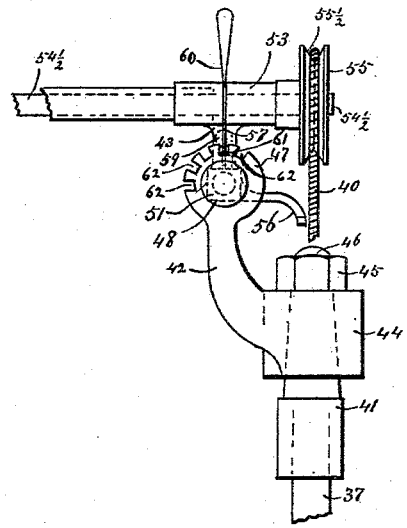

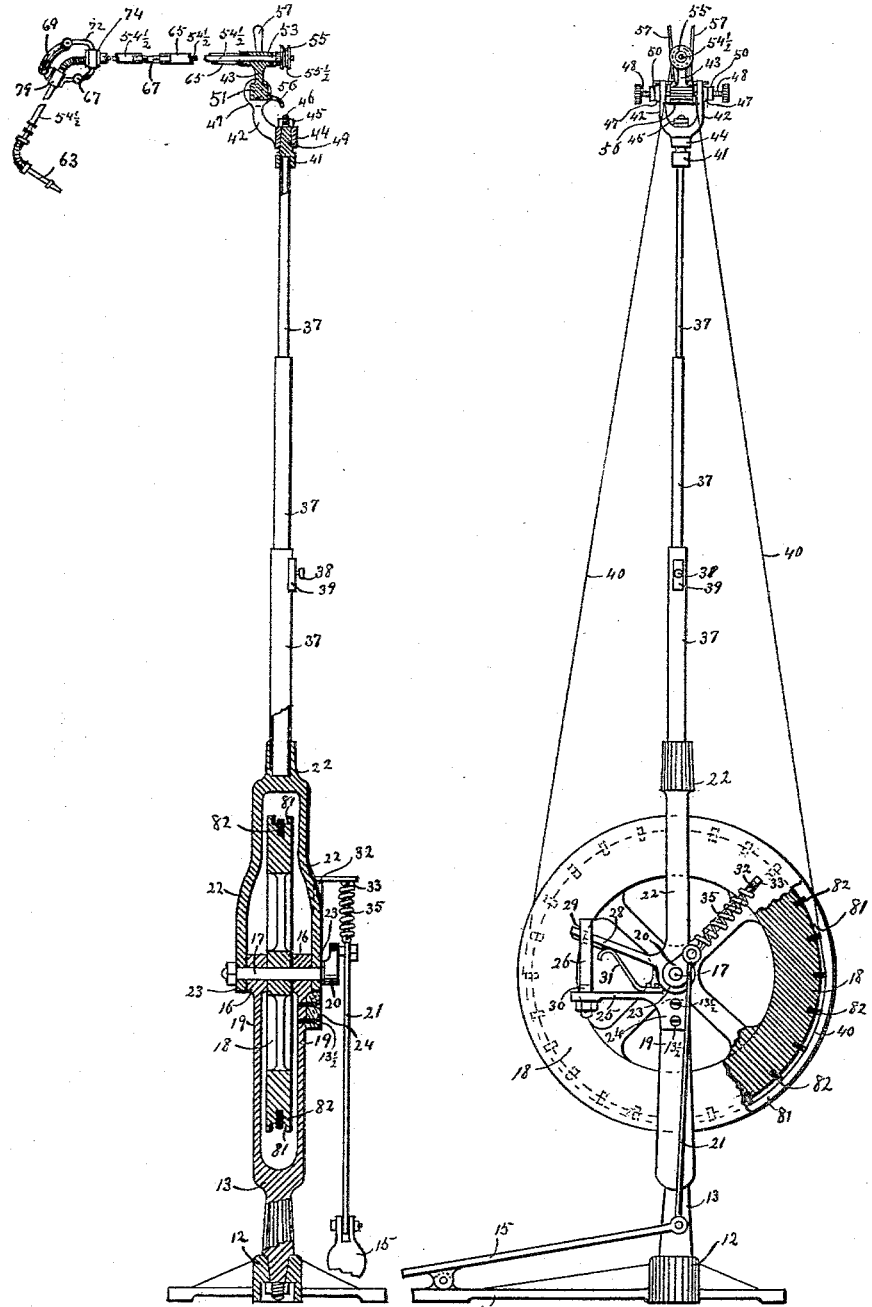

(No Model.)  3 Sheets—Sheet 2.

W. B. MANN.
DENTAL ENGINE.

No. 378,204.  Patented Feb. 21, 1888.

Witnesses
E. R. Rowley.
C. Carroll Egerton.

Inventor,
Wm. B. Mann.
By his Attorney,
Wm. L. Bailie.

(No Model.) 3 Sheets—Sheet 3.

W. B. MANN.
DENTAL ENGINE.

No. 378,204. Patented Feb. 21, 1888.

Witnesses.
E. R. Rowley.
C. Carroll Egerton.

Inventor,
Wm. B. Mann.
By his Attorney.
Wm. Le Bailie,

UNITED STATES PATENT OFFICE.

WILLIAM B. MANN, OF BALTIMORE, MARYLAND.

DENTAL ENGINE.

SPECIFICATION forming part of Letters Patent No. 378,204, dated February 21, 1888.

Application filed September 29, 1887. Serial No. 251,008. (No model.)

*To all whom it may concern:*

Be it known that I, WILLIAM B. MANN, a citizen of the United States, residing at Baltimore, in the State of Maryland, have invented certain new and useful Improvements in Dental Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvement in that class of dental engines which comprise in their structure a forked standard with a tripod-base carrying a foot-treadle and driving-pulley, and an arm rising from the said forked standard which is free to be vibrated, and provided on the end thereof with a pulley which is driven by a belt from the said driving-pulley, the driven pulley imparting a rotating movement to a flexible shaft, on the free end of which is attached the operating-tool, the said flexible shaft being free to be moved in various directions to suit the convenience of the operator.

My improvement consists in providing mechanism whereby a vibrating movement is permitted the said vibrating arm which rises from the forked frame without impairing the strength or solidity of the engine, the same mechanism providing means by which the engine-crank is kept off its center and in a convenient position for operation.

My invention further consists in providing suitable and substantial means to prevent the slipping of the cord or belt on the driving-pulley, and in the construction of an improved pulley-head, which is so constructed that it is free to be moved in any desired direction, and provided with means to securely lock it in any suitable position in the vertical plane, the said pulley-head being likewise provided with means to keep the driving-cord on the driven pulley when moved out of the plane of the driving-pulley. For the further convenience of the operator, the rotating shaft for imparting movement to the operating-tool is made flexible, and thereby extensible, the joints in the said shaft being so constructed as to prevent too sharp a bend or any undue strain being put upon the parts thereof.

In the further description of my invention, reference is had to the accompanying drawings, in which—

Figure 4:
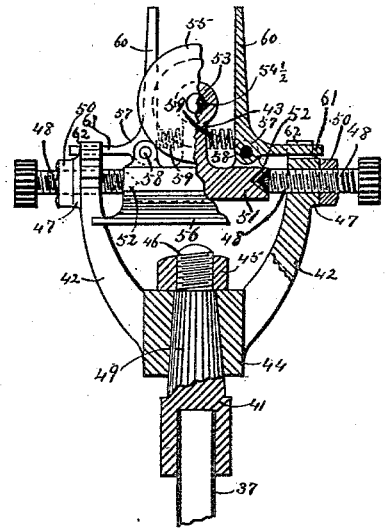
Figure 5:
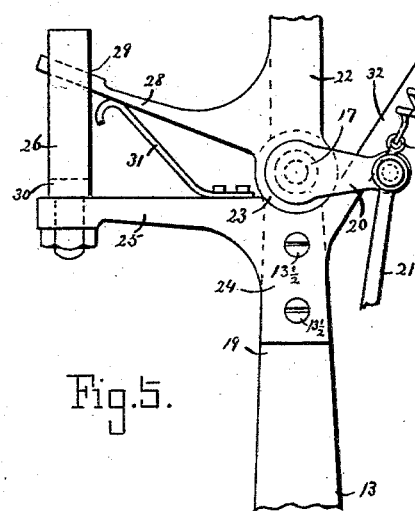
Figure 6:
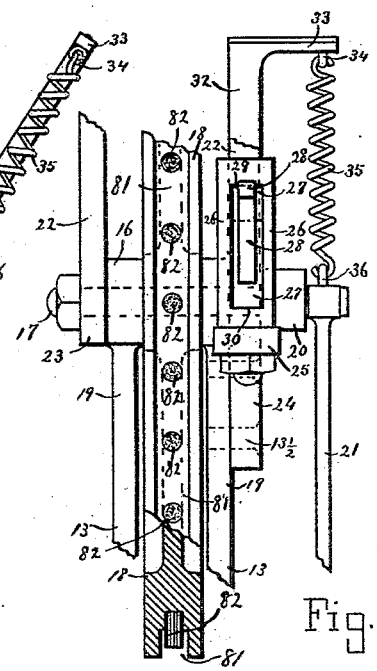
Figure 7:
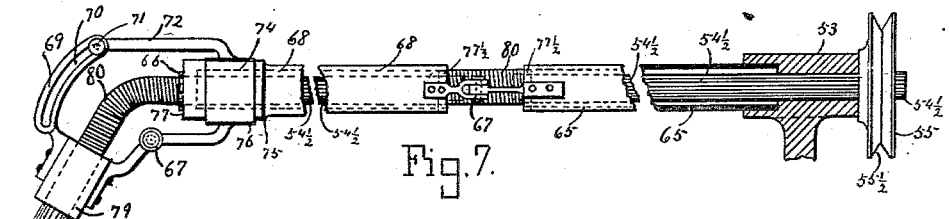
Figure 8:
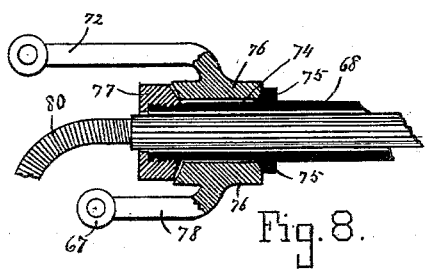
Figure 9:
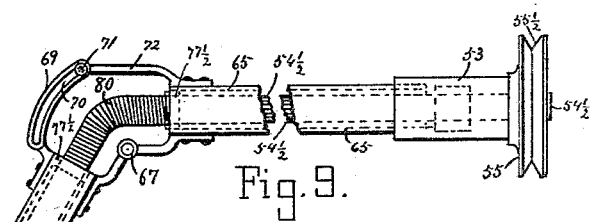
Figure 10:
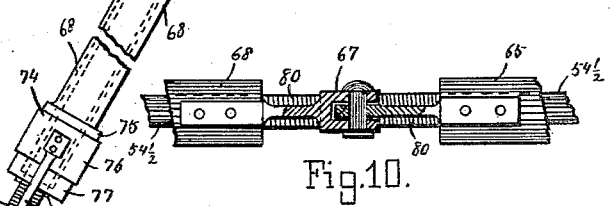
Figure 11:
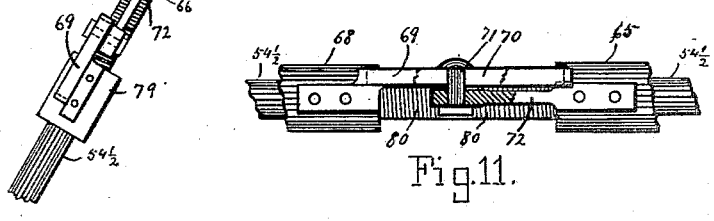

Figure 1 is a section through the device, showing the flexible shaft broken and the vibrating arm partly in full. Fig. 2 is a side elevation of the device with the driving-wheel partly in section and the flexible shaft removed. Fig. 3 is a detailed side elevation in full of the pulley-head. Fig. 4 is a detailed front elevation of the pulley-head, partly in section, and a section through the cone-head of vibrating arm. Fig. 5 is a detailed side elevation in full of the mechanism to control the vibrating movement of arm and means for keeping engine-crank off its center. Fig. 6 is a front elevation of the device shown in Fig. 5. Fig. 7 is a detailed side elevation of the flexible shaft, shown broken, with a part of the pulley-head in section. Fig. 8 is an enlarged detailed view, partly in section, of the swivel-joint employed on the flexible shaft. Fig. 9 is a view looking down on the device shown in Fig. 7, shown broken. Fig. 10 is an enlarged detailed side view of hinge employed on flexible shaft, showing section through the pivot. Fig. 11 is an enlarged detailed side view of stop-plate and guide employed on flexible shaft, showing section through pin.

The same figures refer to the same or similar parts throughout the several views.

The figure 12 denotes the tripod-base, which supports the forked standard 13, the foot 14 being the longer and having pivoted thereto the treadle 15 for operating the mechanism. The forked standard 13 is provided with the bearings 16, which support the rotating shaft 17, on which is secured the driving-pulley 18, and which is caused to rotate between the jaws 19 of the said standard 13 by means of the crank 20, which is operated by the pitman 21 and treadle 15. Supported by the shaft 17, and free to vibrate thereon, is the forked arm 22, which has its bearings 23, one on each of the projecting ends of the said shaft 17. In order to maintain the vertical position of the vibrating arm 22 and confine its movement within certain limits of an arc, the plate 24, which is provided with the extended arm 25, is secured on one side of the standard 13 by means of the screws 13½. On the end of this extended arm is secured a slotted guide, 26, in the slot 27 of which moves the end of the foot 28, which is extended from one side of the forked vibrating arm 22 and made integral therewith. The travel of the said foot 28 is limited by the length of the slot 27 in the guide-stop 26. When bearing against the top 29 thereof the vibrating arm 22 is in its vertical position, and when against the bottom 30 thereof the said arm 22 is at its greatest inclination. A spring, 31, is secured to the arm 25 and its free end bears against the foot 28 and maintains normally a vertical position of the said vibrating arm 22.

In place of the guide-stop 26, an arc forming a stop may be employed for limiting the amount of travel of the foot 28; or any of the devices in common use may be employed for this purpose. I prefer, however, the guide-stop 26, as rendering greater rigidity to the structure and preventing any but a direct strain upon the mechanism at this point.

To provide means to keep the engine-crank 20 off its center, the plate 24 is secured on the crank side of the forked standard 13, and is provided with an additional extended arm, 32, on the end whereof is the offset 33, to bring it in line with the pitman 21, in the end of which is an eyebolt, 34, whereto is secured one end of the spiral spring 35, the other end of the said spring 35 being secured to an eyebolt, 36, which is fixed in the crank end of the pitman 21, whereby the tension of the said spring 35, when the engine is not in operation, draws the crank 20 off its center in line with the offset 33 and holds it in this position convenient for starting, the position of the said spring 35 being such that the resistance offered thereby is mostly when the pressure of the foot is applied to the treadle 15 in the downward movement of the crank 20, the tension of the said spring 35 pulling on the crank in its upward movement, when but little power is derived through the treadle 15, and thus applying a uniform power to the said crank in its revolutions.

The upper portion of the vibrating arm 22 is constructed of different-sized tubing 37, and a telescopic movement is provided in some one of the joints, a set-screw, 38, and clamping-plate 39 serving to secure the joint in the desired position, as in common usage, whereby the driving-cord 40 may be tightened or slackened, as may be desired, by the extension or shortening of the said arm 22. The top section of the tubing 37 of the vibrating arm 22 terminates in the cone-bearing 41, which supports thereon the bifurcated frame 42 of the pulley-head 43, the base 44 of the frame 42 being bored to suit the cone 49, on which it is placed and free to rotate thereon, the cone 49 terminating in the spindle 46, and the nut 45 thereon holding the said frame 42 in its position on the cone. The bosses 47 of the frame 42 are threaded to suit the bearing-screws 48, which are provided with cone-points and serve to support the pulley-head 43, a lock-nut, 50, being provided on each bearing-screw 48, whereby it is locked in position. The pulley-head 43 consists of a plate, 51, which is provided on each side with a countersink, 52, to suit the cone-points of the bearing-screws 48, by which it is supported, and an oscillating movement of the pulley-head 43 permitted thereby. Integral with this plate 51 is the bearing 53, which supports the rotating shaft 54½, this shaft 54½ being driven by the pulley 55, which receives its movement from the driving-pulley 18 through the cord 40, in the usual manner. On one side of the plate 51 is an extension which forms the guard 56, which serves to keep the cord 40 on the pulley 55 when the said pulley, by the change of angle in the pulley-head 43, is not in the same plane with the driving-pulley 18. As described, the pulley-head is free to oscillate on its bearings formed by the screws 48, whereby the shaft 54½ may be operated at the desired angle. In order to secure the pulley-head 43 at this angle, the locking-levers 57 are provided and are fulcrumed at 58 on the plate 51, one on either side thereof. A spring, 59, being placed between its long arm 60 and the pulley-head, serves to hold the short arm 61 in the down position and in one of the slots 62, which are formed on the periphery of the bosses 47 of the frame 42. These slots 62 are placed around the said bosses 47, as represented in Fig. 3, this distribution permitting sufficient movement in the depression or elevation of the said shaft 54½. In order to prevent the slipping of the cord 40 on the driven pulley 55, the said pulley is constructed with the V-groove 55½, as is commonly done, whereby sufficient friction is produced by the cord 40 becoming slightly wedged therein.

To provide against the slipping of the cord 40 on the driving-pulley 18, this pulley is provided with the groove 81 around its periphery, in which are set at regular distances the rubber or elastic plugs 82, these plugs being set in suitable holes bored in the pulley 18 and driven tightly therein, the ends of the said plugs 82 projecting sufficiently far within the groove 81 to form a contact-surface with the driving-cord 40, and thereby form sufficient frictional contact to prevent the slipping of the said cord. This arrangement of forming a frictional surface permits of any degree of elasticity, accordingly as more or less of the plugs 82 are made to project in the groove 81, and possesses the further advantage of not becoming stretched from use and rendered unfit for service, as is the case when elastic bands are employed for this purpose.

The rotating shaft 54½, which conveys the movement to the operating-tool 63, is made of the sections 54½, as represented in Figs. 7 and 9, each section, to permit flexibility, being joined by the twisted-wire shaft 80, whereby the shaft at this point may be bent to the desired angle, and on the end of the last section of which is attached the hand-piece 63 in the usual manner. In order to render support to these sections of shaft 54½, and at the same time limit its movement within a certain angle, the sectional casings 65 68 are placed therearound, the first section, 65, being rigidly secured to the bearing 53 of the pulley-head and forms a support for this first section of shaft. Hinged to this first section of casing, 65, at the point where the sections of shaft 54½ are joined by the twisted-wire shaft 80 is another section of casing, 68, which supports this second section of shaft 54½, the hinge 67 permitting the said sections to be bent at this point in the plane of the said hinge. To limit the extent of this bend, and at the same time form a support on the other side of the casings 65 68, the stop-plate 69 is secured to the casing 68, in the slot 70 of which a pin, 71, moves, that is secured to the tongue 72, which is secured to the section of casing 65, thus limiting the bend of this joint by the length of the said slot 70.

An additional bend is permitted by a like joint at a point where the two last sections of the shaft 54½ are connected, this joint being further provided with the swivel-joint 74, which is constructed as represented in Fig. 8, wherein the sleeve 76 is permitted to rotate upon the section of casing 68, the collar 75 forming a guide on one side thereof, and the nut 77, which screws on the end of the casing 68, serving as a guide on this side, the nut 77 likewise forming a bearing for this end of the section of shaft 54½. Integral with this sleeve 76 are the tongue 78 of the hinge 67 and the tongue 72, the pin 71 of which moves in the slot 70 of the stop-plate 69, whereby this hinge 67 may be bent in any desired plane. The last section of casing, 79, may be but a short piece, as represented in the drawings, and forms a bearing for this last section of shaft at this point. The sections of casing 65 68 may be made sufficiently large to prevent friction to the shaft and bearings provided in the ends thereof by inside collars, 77½, or some like device of common usage.

The manner of operating is as follows: When the engine is not in operation, the pulley-head 43 is thrown at such an angle as to permit the shaft 54½ to hang vertically and close to the engine, in which position the guard 56 keeps the driving-cord 40 in its position on the pulley 55 by the said cord resting on the edge of the guide 56, which is in line with the groove 55½. When it is desired to extend the said shaft 54½ for use, the locking device is released by drawing toward each other the long arms 60, whereby the short arms 61 will be raised out of the slots 62, the pulley-head 43 placed at the desired angle, and the arms 60 released, when the spring 59 will cause the short arms 61 to fall in its opposite slot, 62 and the device will be secured in this position. As previously described, the spring 35 holds the crank 20 off its center and in a convenient position for starting when the pressure of the foot is applied to the treadle 15. The projecting ends of the rubber plugs 82, which are set in the groove 81 of the driving-pulley 18, over which the cord 40 travels, produce sufficient friction to prevent slipping of the cord. Said cord is prevented from slipping on the driven pulley 55 by the V-groove 55½, as described. The vibrating arm 22 is held normally in the vertical position by the spring 31, a limited vibrating movement in the direction of the operator being provided for convenience in operating. This movement is permitted by the employment of the plate 24 with its projecting arm 25, on which is the slotted guide and stop 26, and in which moves the foot 28 of the vibrating arm 22, the said slotted guide serving both as a guide and a stop to limit the movement of the vibrating arm, the spring 31 serving to maintain the vertical position thereof. The advantage of the slot 27 in the guide 26 is that it prevents a lateral or any but a direct strain on this part of the engine. For the simple purpose of a stop, as described, any of the devices in common use may be employed. The arms 25 and 32 may be made integral with the forked standard 13; but for convenience of manufacture and facility of repairs I prefer, however, to use the plate 24.

For the further convenience of the operator the flexible driving-shaft 54½ is constructed as described, whereby greater freedom of movement is allowed the operating-tool, which is attached to the end thereof, the joints which permit the flexibility to the shaft being so constructed that too sharp a bend cannot be made therein, thus protecting the twisted-wire shaft 80, which connects the sections of shaft 54½, from injury from this source.

As described, the vibrating arm 22 is not permitted to move in one direction beyond the vertical position. The flexibility of the shaft 54½, which is provided with the joints, as herein described, compensates for this by rendering the said shaft 54½ in a degree extensible, and the hand-piece 63 may be moved in this direction independent of the movement of the said vibrating arm 22.

Having described my invention and the manner of operating, what I claim, and desire to secure by United States Letters Patent, is—

1. In a dental engine, the combination of the plate 24, secured to the standard 13 and provided with an arm, 25, a stop, 26, the foot 28, extended from the vibrating arm 22, and a spring, 31, for the purpose set forth.

2. In a dental engine, the combination of the plate 24, secured to the standard 13, the arm 25, extending from one side of the plate 24, the stop 26, the foot 28, extended from the vibrating arm 22, the spring 31, the arm 32, extended from the other side of the said plate 24, the pitman 21, the crank 20, and the spiral spring 35, for the purpose set forth.

3. In combination with a dental engine, the arm 32, extended from the standard 13 and rising to a point above the crank 20 when the said crank is at its highest point, the pitman 21, the crank 20, and the spiral spring 35, one end of the said spiral spring 35 being secured to the crank end of the pitman and the other end thereof secured to the extremity of the arm 32, for the purpose set forth.

4. In a dental engine, the combination of a driving-pulley, 18, with a groove, 81, around its periphery, the elastic plugs 82, set in the said groove 81, and the ends of said plugs projecting therefrom, the shaft 17, the crank 20, the treadle 15, the driven pulley 55, and the belt 40, for the purpose set forth.

5. In combination with a dental engine, the vibrating arm 22, provided at its free end with the cone 41, on which is seated and free to rotate thereon the pulley-head 43, and a pulley-head, 43, consisting of the bifurcated frame 42, the bearing-screws 48, the plate 51, the guard 56, the bearing 53, the pulley 55, the shaft 54½, and a locking device composed of the locking-lever 57, the spring 59, and the slots 62, formed in the frame 42, for the purpose set forth.

6. In combination with a dental engine, the pulley-head 43, the pulley 55, and a flexible shaft consisting of the sectional shaft 54½, the twisted-wire shaft 80, and the sectional casing 65 68, the sections forming the said casing 65 68 being joined by the hinge 67 on one side thereof, and the opposite side thereof provided with a slotted stop-plate, 69, and tongue 72, whereby the movement of said hinge 67 is limited and additional support rendered the said joint, for the purpose set forth.

7. In combination with a dental engine, the pulley-head 43, the pulley 55, and a flexible shaft consisting of the sectional shaft 54½, the twisted-wire shaft 80, and the sectional casing 65 68, the sections forming the said casing being connected by a hinge, 67, a slotted stop-plate, 69, a tongue, 72, and a swivel-joint, 74, whereby a universal movement may be given this joint, for the purpose set forth.

In testimony whereof I affix my signature in presence of two witnesses.

WILLIAM B. MANN.

Witnesses:
  WM. L. BAILIE,
  JNO. T. MADDOX.